United States Patent [19]

Shigematsu et al.

[11] Patent Number: 4,718,306
[45] Date of Patent: Jan. 12, 1988

[54] POWER TRANSMISSION FOR USE IN AUTOMOBILES CONTINUOUSLY VARIABLE TRANSMISSION

[75] Inventors: Takashi Shigematsu; Tomoyuki Watanabe; Setsuo Tokoro, all of Susono; Daisaku Sawada, Gotenba, all of Japan

[73] Assignee: Toyota Jidosha Kabushiki Kaisha, Toyota, Japan

[21] Appl. No.: 36,123

[22] Filed: Apr. 7, 1987

Related U.S. Application Data

[60] Division of Ser. No. 841,427, Aug. 4, 1986, which is a continuation of Ser. No. 642,654, Aug. 21, 1984.

[30] Foreign Application Priority Data

Aug. 29, 1983 [JP] Japan .................................. 58-156464

[51] Int. Cl.⁴ .............................................. B60K 41/16
[52] U.S. Cl. ..................................... 74/866; 74/862; 192/106 F; 364/424.1
[58] Field of Search ............... 74/862, 864, 865, 866, 74/867; 364/424.1; 192/103 R, 106 F, 109 F; 474/18

[56] References Cited

U.S. PATENT DOCUMENTS

| | | | |
|---|---|---|---|
| 3,534,840 | 10/1970 | Snoy | 192/106 F |
| 3,863,746 | 2/1975 | Schulz | 192/106 F |
| 4,403,975 | 9/1983 | Rattunde | 474/18 |
| 4,430,910 | 2/1984 | Lemieux et al. | 74/867 |
| 4,458,318 | 7/1984 | Smit et al. | 364/424.1 |
| 4,462,275 | 7/1984 | Mohl et al. | 74/866 |
| 4,466,521 | 8/1984 | Hattori et al. | 74/866 |
| 4,476,746 | 10/1984 | Miki et al. | 74/867 |
| 4,515,041 | 5/1985 | Frank et al. | 74/866 |
| 4,520,912 | 6/1985 | Ferris et al. | 192/106 FX |
| 4,522,086 | 6/1985 | Haley | 74/867 |

*Primary Examiner*—Leslie Braun
*Assistant Examiner*—Dwight G. Diehl
*Attorney, Agent, or Firm*—Oblon, Fisher, Spivak, McClelland & Maier

[57] ABSTRACT

A belt type continuously valiable transmission (CVT) comprises a pair of input pulleys, a pair of output pulleys and a belt trained over input and output pulleys to transmit power. Each pair of the pulleys has a hydraulic cylinder for pressing the pulleys against the belt. A line pressure used in one cylinder is controlled by adjusting an electric pressure regulating valve. A correction value is calculated which corresponds to the square of the rotational speed of the hydraulic cylinder to which line pressure is supplied. The value of control signal of the pressure regulating valve is corrected in accordance with the correction value, so that the error of the line pressure due to a centrifugal force is compensated for.

3 Claims, 12 Drawing Figures

F I G . 7
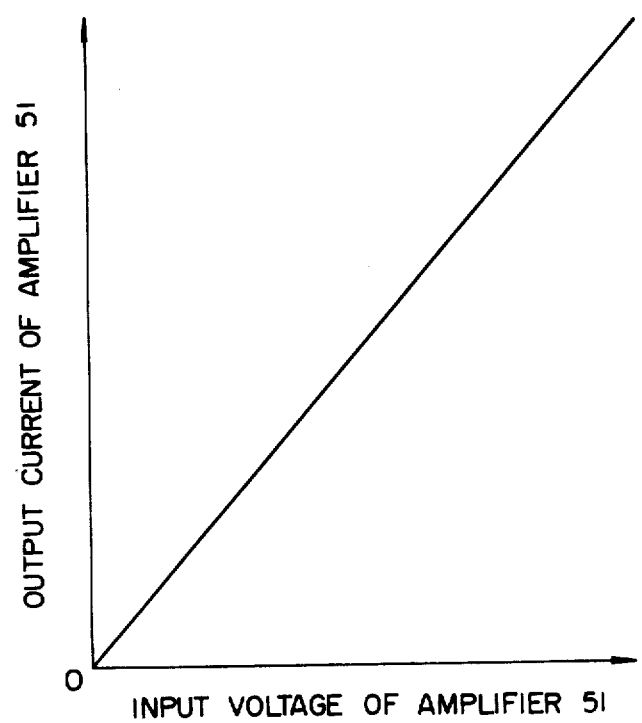

POWER TRANSMISSION FOR USE IN AUTOMOBILES CONTINUOUSLY VARIABLE TRANSMISSION

This application is a division of application Ser. No. 841,427 filed on Aug. 4, 1986 which is a continuation of abandoned patent application Ser. No. 642,654, filed Aug. 21, 1984.

BACKGROUND OF THE INVENTION

1. Field of the Invention:

This invention relates to a power transmission for use in vehicles provided with a continuously variable transmission (hereinafter called "CVT").

2. Description of the Prior Art:

A CVT is used for an excellent power transmission system which is to control continuously speed ratio e(=the output side rotational speed Nout/input side rotational speed Nin) to improve the specific fuel consumption of a vehicle. In a belt type CVT, a belt is trained over a pair of input side pulleys and a pair of output side pulleys, the input and output side pulleys are provided respectively with hydraulic cylinders to control press forces of the input and output side pulleys according to oil pressure supplied to the hydraulic cylinder and oil pressure in the hydraulic cylinder of one of the input and output side pulleys (usually the output side pulleys) provides line pressure which is controlled in relation to the transmission force of the belt by an electromagnetic relief valve to thereby avoid the slip of the belt while restraining the drive loss of an oil pump. However, since the hydraulic cylinder is rotated integrally with the pulley, a centrifugal force acts on a hydraulic medium in the hydraulic cylinder so that actual oil pressure becomes larger than a controllably intended value due to said centrifugal force. This increases the press force of the pulleys, causing the degradation of the transmission efficiency of the CVT and the lives of respective parts of the CVT. For prior corrective measures against such degradation are there a method of offsetting constructionally the centrifugal force itself of the hydraulic medium and a method of providing an oil reservoir in a rotary portion integral with the hydraulic cylinder and detecting an oil pressure value in the oil reservoir as a signal related to the centrifugal force through a Pitot tube to correct the line pressure through a pressure regualting valve on the basis of the detected value. In the former method, however, the offsetting of the produced centrifugal force is limited to about 50% and in the latter method problems are encountered in that the construction is complicated while power loss due to stirring is brought about. Both methods present obstacles against the practical use of prior corrective measures.

SUMMARY OF THE INVENTION

An object of the present invention is to provide a power transmission system for a vehicle having a CVT which is to offset the increment of line pressure due to a centrifugal force without any troubles in the practical use.

According to the present invention is noted the following facts. That is, the increment $\Delta Pl$ of line pressure Pl caused by the centrifugal force is represented by the following formula;

$$\Delta Pl: \frac{\rho \cdot \omega^2}{4} \cdot (R2^2 + R1^2) \quad (1)$$

$\omega$: angular velocity of hydraulic cylinder
R2: radius of hydraulic cylinder
R1: radius of boss of hydraulic cylinder $\rho$, R2 and R1 are constant irrespective of the running condition of an engine and $\omega^2$ is proportional to the square $Nc^2$ of the rotational speed Nc of the hydraulic cylinder, so that $\Delta Pl$ is substituted as the following formula represents;

$$\Delta Pl = K \cdot Nc^2 \quad (2)$$

provided K is a constant.

Thus, in the power transmission system for use in a vehicle according to the present invention which comprises a belt system continuously variable transmission provided with a pair of the input side pulleys arranged opposed to each other to vary the distance therebetween in relation to oil pressure in the hydraulic cylinder, a pair of the output side pulleys arranged opposed to each other to vary the distance therebetween in relation to oil pressure in the hydraulic cylinder, a belt trained over the pairs of the input and output side pulleys to transmit rotational torque and an electromagnetic relief valve for controlling the relief amount of oil sent from an oil pump in relation to an electric control signal to produce line pressure related to the electric control signal so that the line pressure is transmitted to the hydraulic cylinder for one of the input and output side pulleys and an electronic control unit including a central processing unit(CPU) controls the electric control signal of the electromagnetic relief valve, the rotational speed Nc of the hydraulic cylinder to which the line pressure Pl is transmitted is detected by a rotational speed sensor and a product value $K \cdot Nc^2$ of the square $Nc^2$ of the detected rotational speed Nc times the constant K is calculated for a correction amount so that the electric control signal of the electromagnetic relief valve is corrected by the electromagnetic control unit to produce the line pressure Pl corrected by this correction amount $K \cdot Nc^2$ in the electromagnetic relief valve.

Consequently, the increment of the line pressure Pl due to the centrifugal force is offsetted by the decrement of same due to the correction so that the line pressure Pl provides a value meeting the transmission power of the belt as the final result in the hydraulic cylinder to prevent the degradation of the transmission efficiency of the CVT, the increase of drive loss of oil pump, the shortening of lives of respective parts in the CVT or the like. Further, according to the present invention, the addition of construction of the CVT and provision of a Pitot tube are not needed so that the electric control signal of the electromagnetic relief valve is to be varied correspondingly only to the correction amount $K \cdot Nc^2$ to simplify the construction and facilitate extremely the practical use.

According to the present invention, since the line pressure Pl is corrected by varying the electric control signal of the electromagnetic relief valve, the line pressure Pl is to be more precisely controlled compared with one corrected by the use of control oil pressure.

The accompanying drawings, which are incorporated in and constitute part of this specification, illustrate embodiments of the invention and, together with the description, serve to explain the principles of the invention.

BRIEF DESCRIPTION OF THE DRAWINGS

FIG. 7 is a graph illustrating the relationship between the input and output of a pressure regulating valve;

DESCRIPTION OF THE PREFERRED EMBODIMENT

Figure 1:
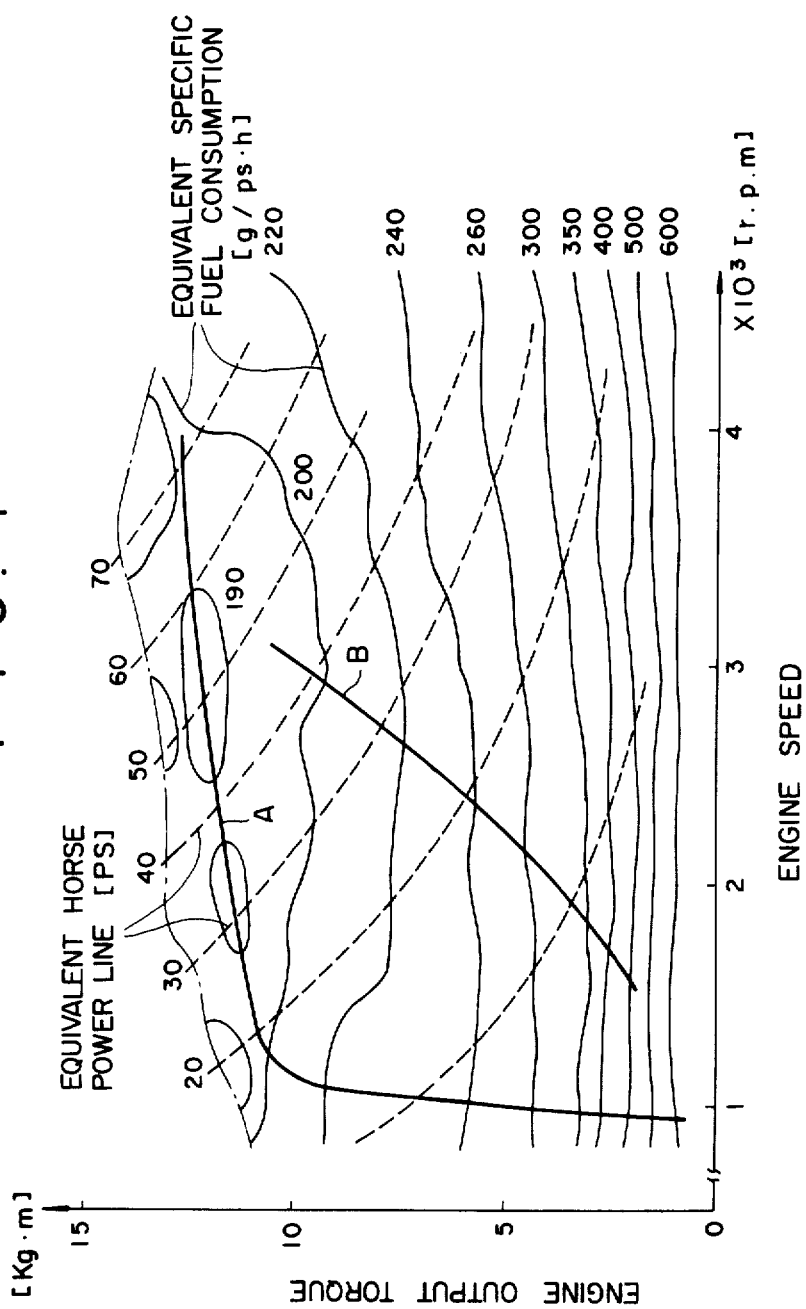
FIG. 1 is a graph illustrating horse power lines and specific fuel consumption lines on a system of engine load-engine torque coordinates.

FIG. 1 shows equivalent specific fuel consumption lines (solid line) and equivalent horse power lines (broken line) on engine speed-engine output torque. Further the unit of the equivalent horse power line is PS and the unit of the equivalent specific fuel consumption line g/PS.h. The dash-dot line shows the property of a throttle valve when it is fully opened, i.e. running limit of the engine. Line A is one interconnecting points of the minimum specific fuel consumption in each output horse power. When this line was set like line B in the speed ratio of conventional transmissions the specific fuel consumption was not good. According to the present invention the desired horse power of the engine is set as a function of operating amount of a accelerator pedal, i.e. pedalling amount thereof to run an internal combustion engine so that the engine speed and the engine output torque are specified by the line A in each desired horse power.

Figure 2:
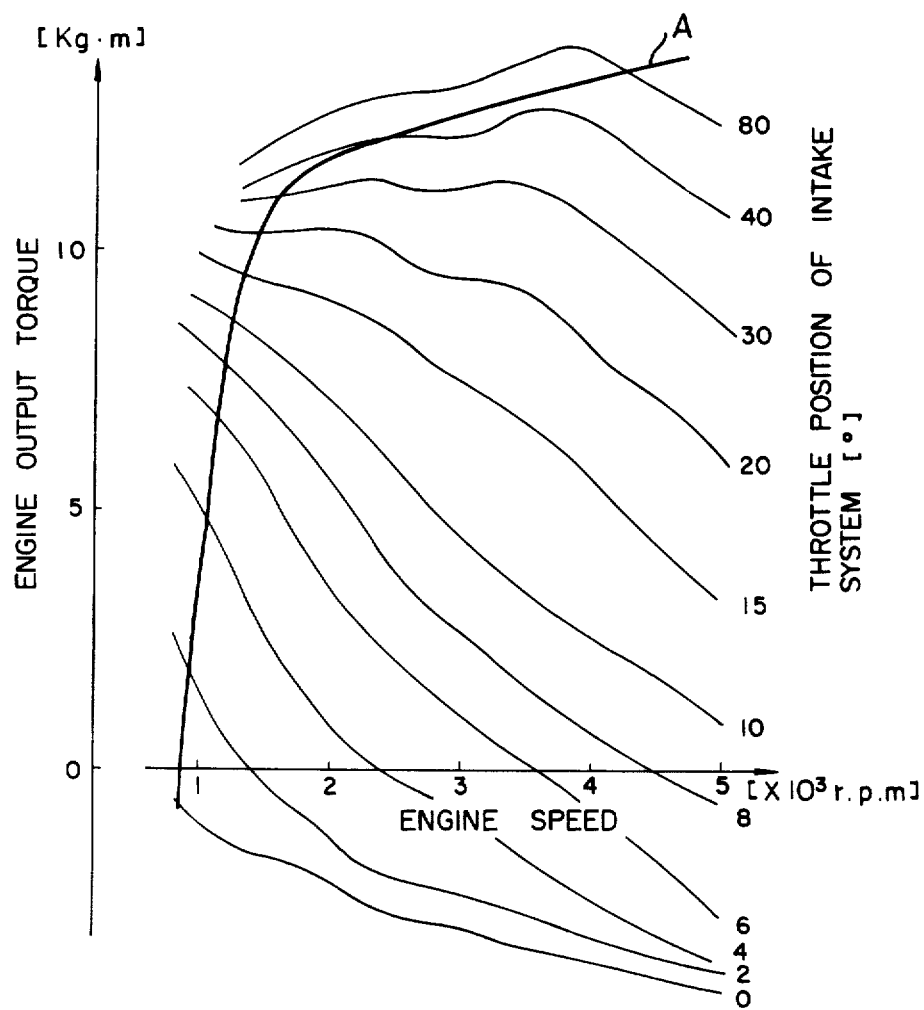
FIG. 2 is a graph showing the relationship among throttle position, engine speed and engine output torque.
Figure 3:
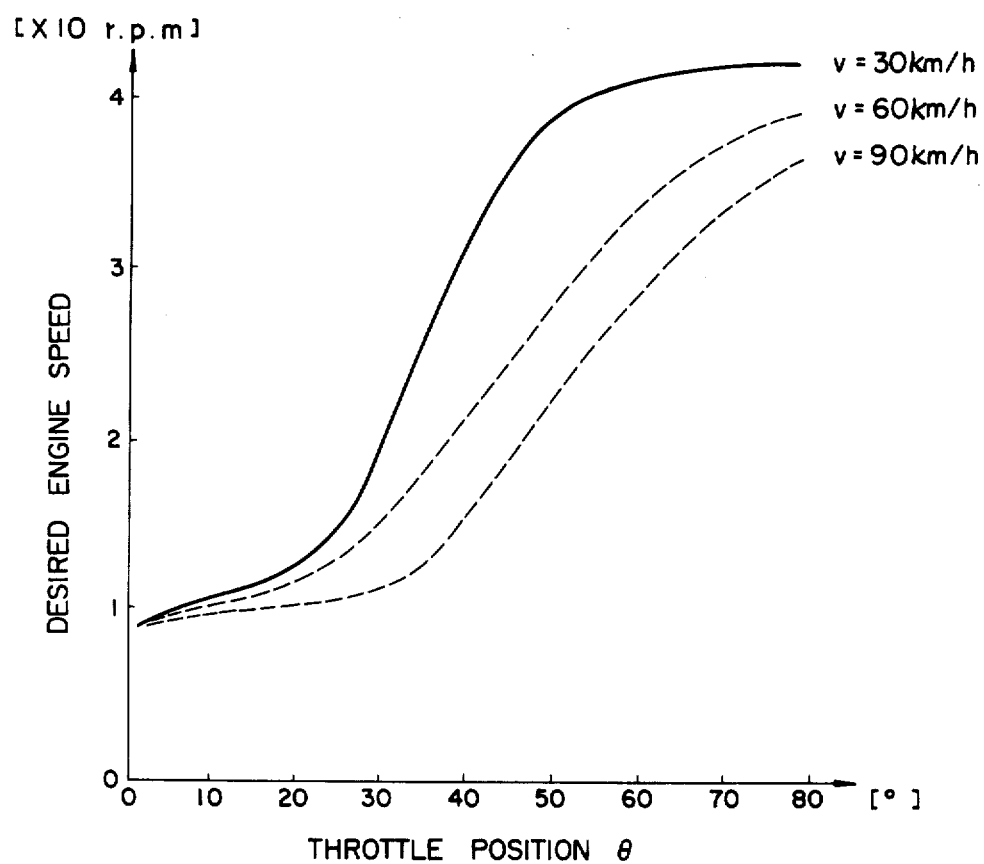
FIG. 3 a graph showing the relationship between the throttle position and the engine speed which is defined in accordance with the line A of FIG. 2.

FIG. 2 shows the relationship between the engine speed and the engine output torque having a parameter of the throttle position of an intake system. A coincides with A shown in FIG. 1, and in the throttle position $\theta\text{th}=10°$ for example the specific fuel consumption becomes minimum with 8.5 kg.m engine output torque and 1250 rpm engine speed. Thus, when the engine is run along the line A, the engine speed is a function of the throttle position $\theta$. When the engine speed as the function of the throttle position $\theta$ specified by the line A is assumed to be a desired engine speed Ne', the relationship between the throttle position $\theta$ and the desired engine speed Ne' is shown in FIG. 3 (solid line). In FIG. 3, the desired engine speed is corrected by vehicle speed because of optimizing an engine, clutch and CVT system (broken line). Under the normal condition, the desired engine speed Ne' is calculated from the throttle position $\theta$ and vehicle speed, and when the speed ratio e of CVT is controlled so that actual engine speed Ne becomes the desired engine speed Ne', then the engine output torque becomes one as specified by the line A in FIG. 1 to run the engine with the minimum specific fuel consumption. In acceleration, the engine torque corresponding to the throttle position $\theta$ is generated by the control delay of CVT and thereafter the engine speed Ne becomes the desired engine speed Ne'. Also in deceleration, similarly due to the control delay of CVT, with the engine speed being unchanged, the engine output torque is previously reduced and then the engine speed reduced as the throttle position is displaced toward the closing one. Namely in the transient time, the change in the engine output torque due to the control delay of CVT precedes the change in the engine speed to compensate for the degradation of running performance.

While various mechanisms have been so far proposed for the CVT, an embodiment of a compact belt system CVT with a large capacity of transmitting torque will be described.

Figure 4:
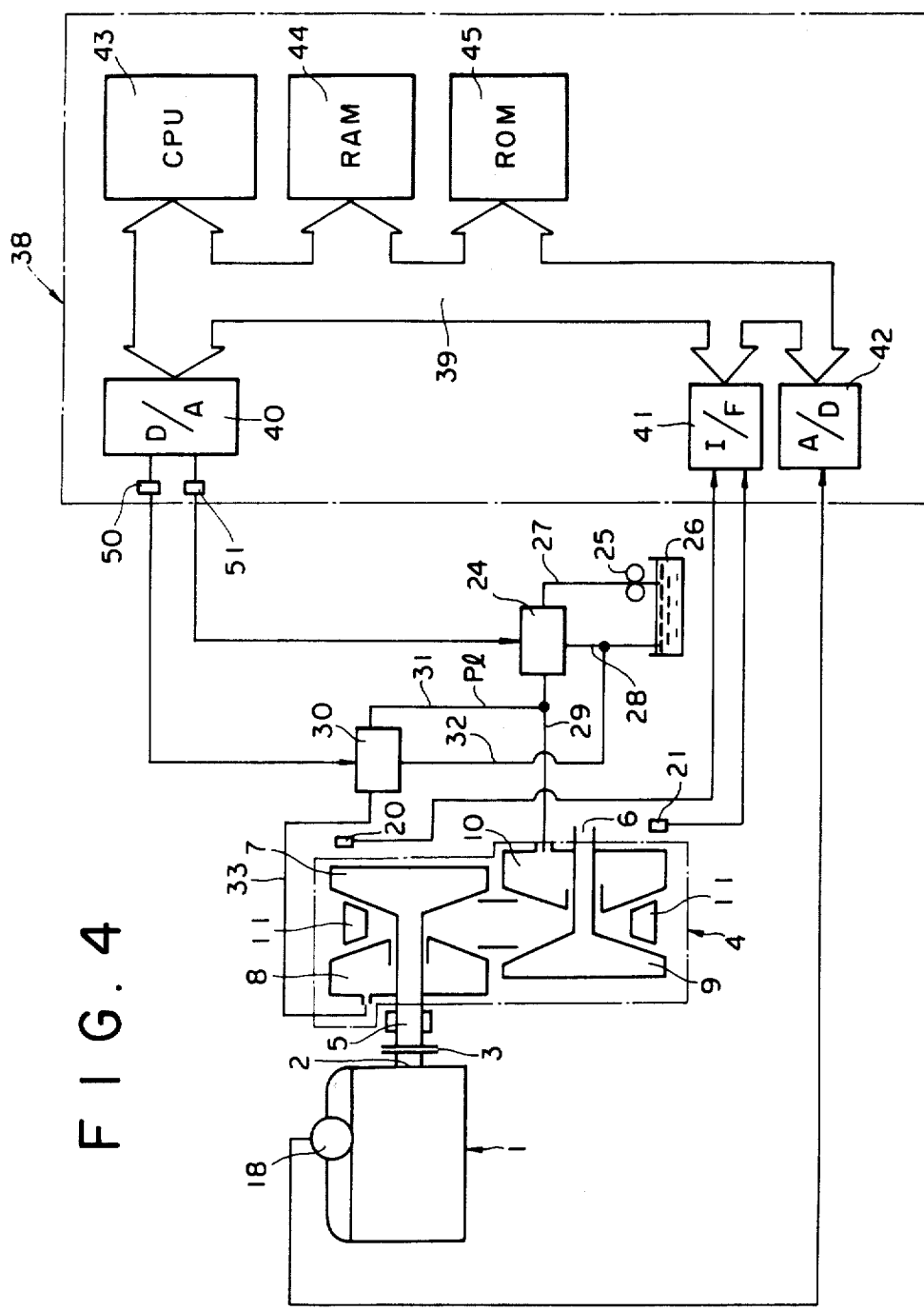
FIG. 4 shows a construction of an embodiment in accordance with the present invention.

In FIG. 4, the output shaft 2 of an internal combustion engine 1 is connected to the input shaft 5 of CVT 4 through a clutch 3. The input shaft 5 and the output shaft 6 of CVT 4 are arranged parallel to each other. The input side fixed pulley 7 is secured fixedly to the input shaft 5 and the input side movable pulley 8 fits axially movably on the outer periphery of the input shaft 5 through splines or ball bearings. The output side fixed pulley 9 is secured fixedly to the output shaft 6 and the output side movable pulley 10 fits axially movably on the outer periphery of the output shaft 6 through splines or ball bearings. Further the pressure receiving area of the movable side pulley is set to provide the input side > the output side, and the fixed and movable pulleys in the input and output sides are arranged axially in the opposite direction to each other. The opposed surfaces of the fixed pulleys 7, 9 and the movable pulleys 8, 10 are formed to be tapered to increase the distances between themselves radially outward so that a belt 11 having an isosceles trapezoidal section is trained over the input and output side pulleys. Thus, as fastening forces on the fixed and movable pulleys are changed, the radial contact positions of the belt 11 on the pulley surfaces are changes continuously. When the contact positions of the belt 11 on the surfaces of the input side pulleys 7, 8 move radially outward, the contact positions of the belt 11 on the surfaces of the output pulleys 9, 10 move radially inward to increase the speed ratio e of CVT 4

$$\left( = \frac{\text{rotational speed } N\text{out of output shaft 6}}{\text{rotational speed } N\text{in of input shaft 5}} \right)$$

and in the reverse case, e is decreased. Power of the output shaft 6 is transmitted to drive wheels not shown. A throttle position sensor 18 detects the throttle position θ of the intake system. An accelerator pedal is connected to a throttle valve of the intake system so that the engine output horse power becomes a desired function of the pedalling amount of the accelerator pedal. The input and output side rotary angle sensors 20, 21 detect respectively the rotary angles, thus the number of revolution of the disks 7, 10. A pressure regulating valve 24 controls oil amount escaping to an oil path 28 as hydraulic medium sent from a reservoir 26 through an oil path 27 by an oil pump 25 to regulate line pressure Pl in an oil path 29. The line pressure Pl is supplied through the oil path 29 to a hydraulic servo of the output side movable pulley 10. A flow controlling valve 30 controls an inflow and an outflow of oil to the input side movable pulley 8. To maintain the speed ratio e of CVT 4 constant, an oil path 33 is disconnected from a line pressure oil path 31 and a drain oil path 32 branched from the oil path 29, i.e. to maintain the axial position of the input side movable pulley 8 constant for increasing the speed ratio e, oil is supplied from the oil path 31 to 33 to increase a fastening force between the input side pulleys 7, 8. To reduce the speed ratio e, oil pressure in the hydraulic servo of the movable pulley 8 is adapted to communicate to the atmospheric side through the drain oil path 32 for decreasing the thrust between the input side pulleys 7, 8. Oil pressure in the oil path 33 is lower than the line pressure Pl. However, since the working area of a piston in the hydraulic servo of the input side movable pulley 8 is larger than the working area of a piston in the hydraulic servo of the output side movable pulley 10, the fastening force between the input side pulleys 7, 8 is to be made larger than that between the output side pulleys 9, 10. To generate the fastening force for ensuring the torque transmission without any slip of the belt 11 in the output side pulleys 9, 10, the line pressure Pl is controlled by the pressure regulating valve 24 and the fastening force between the input side pulleys 7, 8 is changed by the flow controlling valve 30 to control the speed ratio. An electronic control 38 comprises a D/A (Digital-/Analog) converter 40, an input interface 41, an A/D (Analog/Digital) converter 42, a CPU 43, a RAM 44 and a ROM 45 connected to each other by an address data bus 39. The analog output of the throttle position sensor 18 is sent to the A/D converter 42 and pulses of the rotary angle sensors 20, 21 are sent to the input interface 41. The outputs to the flow controlling valve 30 and the pressure regulating valve 24 are sent to the input interface 41. The outputs from the D/A converter 40 are sent to the flow controlling valve 30 and the pressure regulating valve 24 respectively through amplifiers 50, 51.

Figure 5:
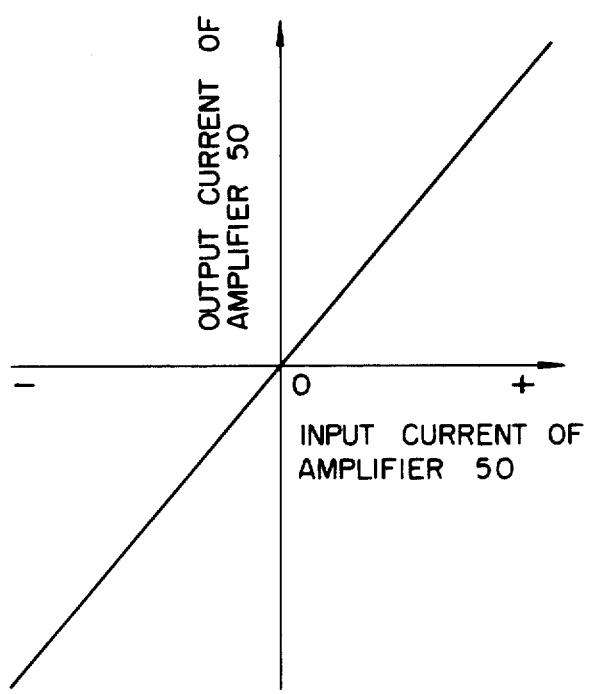
FIG. 5 is a graph illustrating the relationship between the input and output of an amplifier for a flow rate controlling valve.
Figure 6:
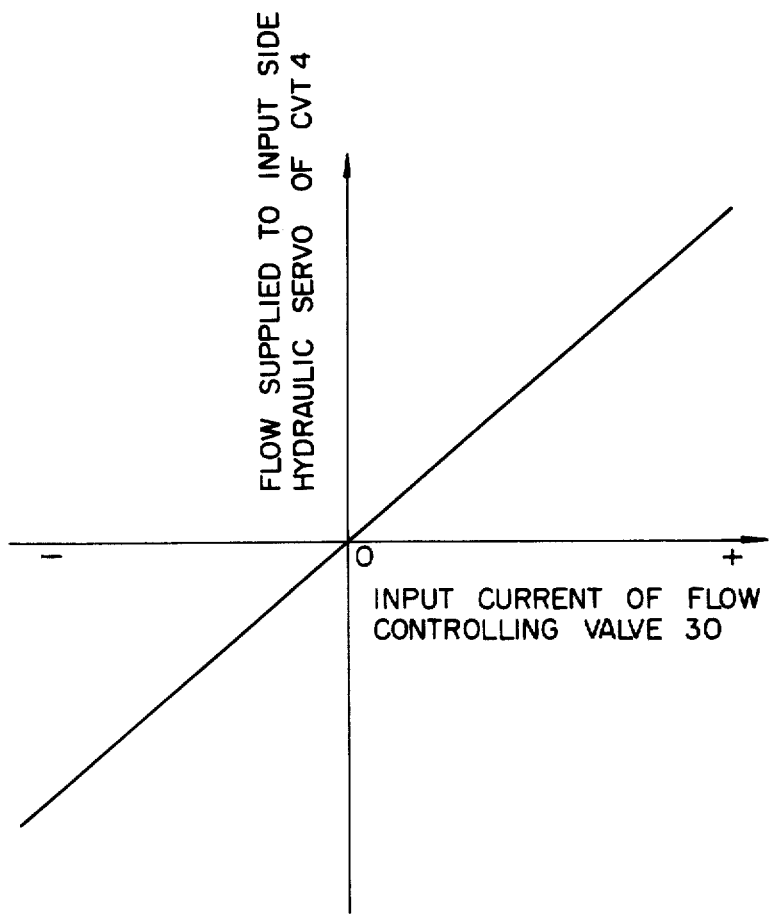
FIG. 6 is a graph illustrating the relationship between the input of the flow rate controlling valve and the flow rate of fluid introduced from the flow rate control valve to the hydraulic input servo of the CVT.
Figure 8:
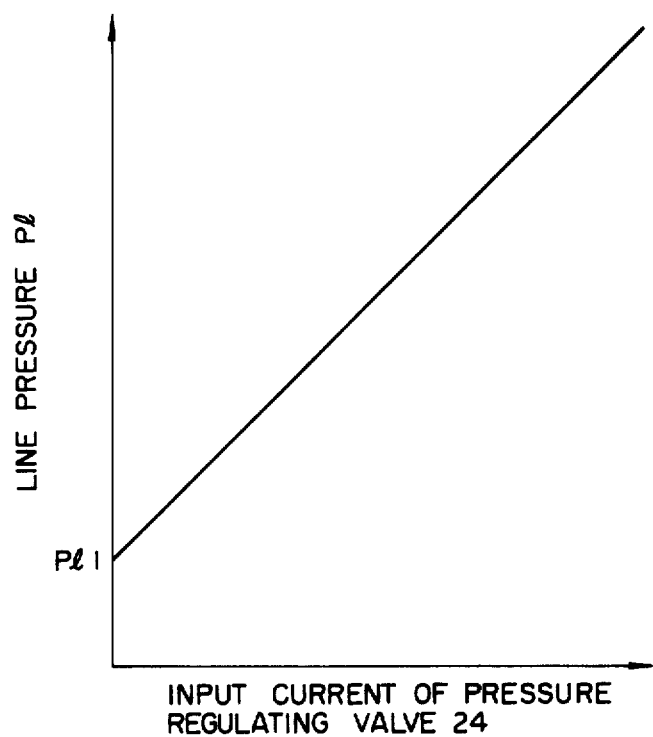
FIG. 8 is a graph illustrating the relationship between the input of the pressure regulating valve and line pressure.

FIG. 5 shows the relationship between the input voltage and the output current of the amplifier 50 for the flow controlling valve 30, and FIG. 6 shows the relationship between the input current of the flow controlling valve 30 and the flow to the input side hydraulic servo of CVT 4. Thus, the change in the input voltage of the amplifier 50 is proportional to the speed ratio e. FIG. 7 shows the relationship between the input voltage and the output current of the amplifier 51 for the pressure regulating valve 24, and FIG. 8 shows the relationship between the input current of the pressure regulating valve 24 and the line pressure Pl. Thus the line pressure Pl is changed linearly relative to the change in the input voltage of the amplifier 51. Even if the input current of the pressure regulating valve 24 is zero, the line pressure Pl is maintained at Pl1 (Pl1≠0) so that a predetermined oil pressure is supplied to the hydraulic servos of the movable pulleys 8, 10 to ensure the minumum torque transmission in the CVT 4 even when any disconnections or failures of the electronic control 38 take place.

Figure 9:
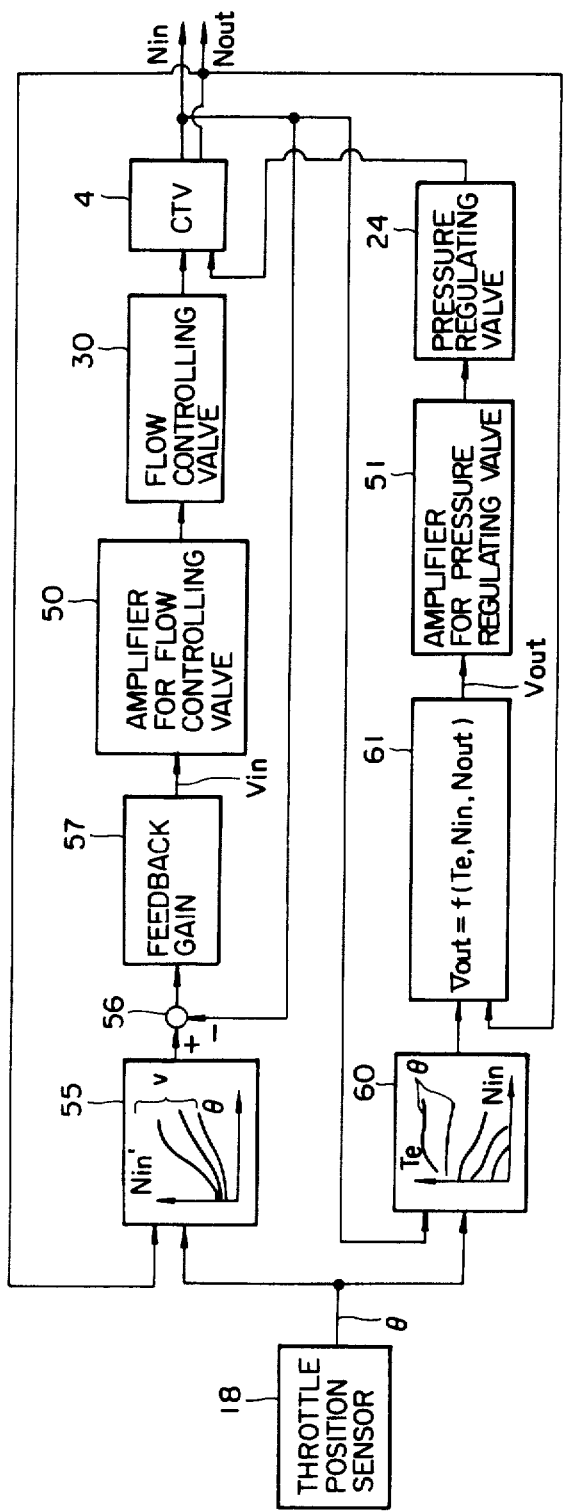
FIG. 9 is a block diagram of an embodiment in accordance with the present invention.

FIG. 9 is a block diagram of an embodiment of the present invention. In a block 55 is calculated the desired engine speed Ne', i.e. desired input rotational speed Nin' of the CVT 4 (Nin'=Ne' in this embodiment) from the throttle position θ and vehicle speed V. Deviation Nin'-Nin of the desired input rotational speed Nin' from the actual input rotational speed Nin of CVT 4 (Nin-Ne' in this embodiment) is obtained at 56. Nin'-Nin is suitably amplified up to Vin in a feedback gain 57 to be sent to the flow controlling valve 30 through the amplifier 50 for the flow controlling valve and feedback controlled so that the speed ratio e of CVT 4, thus the engine speed Ne becomes Ne' with the servo oil pressure of the input side pulley of CVT being changed. In a block 60 is calculated the actual engine output torque Te from the throttle position θ and the actual input rotational speed Nin of CVT 4. As is shown by the equivalent throttle position line in FIG. 2, the actual engine output torque Te is a function of the throttle position θ and the engine speed Ne. While Te may be detected directly by a well-known torque sensor, the torque sensor may be omitted when Te is calculated.

In a block 61, the output voltage Vout to the amplifier 51 for the pressure regulating valve is calculated according to Vout=f(Te, Nin, Nout) from the engine output torque Te, the input and output rotational speed Nin and Nout of CVT 4. The output Vout of the block 61 is sent to the pressure regulating valve 24 through the amplifier 51 for the pressure regulating valve to change the line pressure Pl. As a result, the line pressure Pl is adapted to have the minimum value capable of ensuring the torque transmission by avoiding the slip of the belt 11 so that power loss caused by too much fastening of pulleys of the CVT 4 is to be avoided.

Figure 10:
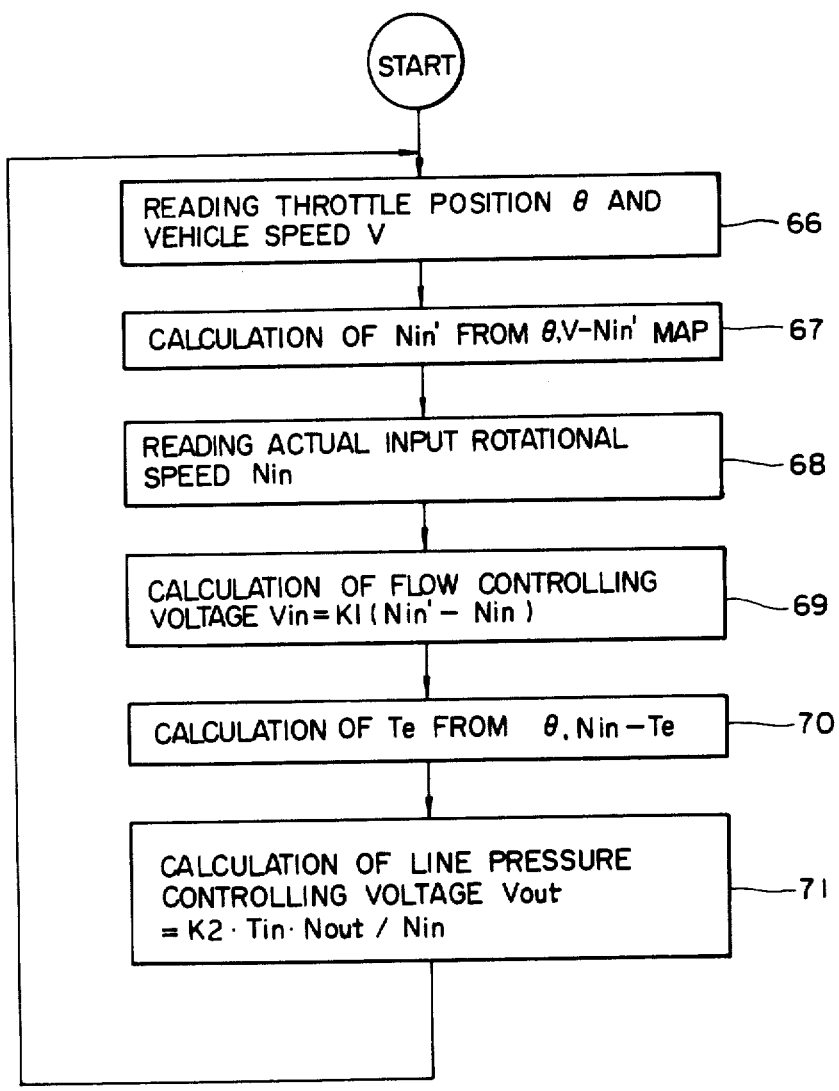
FIG. 10 is a flow chart showing an example of a program in accordance with the block diagram of FIG. 9.

FIG. 10 is a flow chart of a program according to the block diagram in FIG. 9. In step 66 is read the throttle position θ through the input signal from the throttle position sensor 18 and the vehicle speed V from the rotational speed of an output shaft of CVT Nout. In step 67 is calculated the desired input rotational speed Nin' based upon the map of θ'V - Nin' predetermined on the basis of the characteristic line in FIG. 3. In step 68 is read the actual input rotational speed Nin of CVT 4. In step 69 is calculated control voltage Vin sent to the amplifier 50 for flow controlling valve according to Vin=K1(Nin'-Nin), provided K1 is a constant. In step 70 is calculated the engine output torque Te from θ, Nin on the basis of the θ, Nin-Te map which is specified according to the equivalent throttle position line in FIG. 2. In step 71 is calculated the control voltage Vout sent to the amplifier 51 for the pressure regulating valve according to one of the following formulae (3)-(8).

$$Vout = K2 \cdot Te \cdot Nout/Nin \qquad (3)$$

$$Vout = K2 \cdot Tin \cdot \frac{e+1}{e} \qquad (4)$$

$$Vout = K2 \cdot Tin \cdot \frac{e+1}{e} + K3 \cdot Nout^2 \qquad (5)$$

$$Vout = K2 \cdot Tin \cdot \frac{e+1}{e} + K3 \cdot Nout^2 + K4 \cdot Ne \qquad (6)$$

-continued $$V_{out} = K2 \cdot Tin \cdot \frac{e+1}{e} + K3 \cdot Nout^2 + K4 \cdot Ne + K5 \cdot \Delta x \quad (7)$$

and $$V_{out} = K2 \cdot Tin \cdot \frac{e+1}{e} + K3 \cdot \quad (8)$$

$$Nout^2 + K4 \cdot Ne + K5 \cdot \Delta x + \Delta P$$

provided K2, K3, K4 and K5 are constants,

Tin is the input torque of CVT 4 defined by one of formulae (9)–(11), e is speed ratio of belt system CVT 4 (=Nout/Nin), Nout is rotational speed of the output side hydraulic cylinder, Ne is engine speed, $\Delta x$ is the difference $|X'-x|$ between a desired position x' and an actual position x of the input side or output side pulley, and $\Delta P$ is a pressure increment allowing for the line pressure and further Tin and Te are in relation of function to each other.

The following formulae (9)–(11) define Tin.

$$Tin = Tcl \quad (9)$$

$$Tin = Te + \Delta Te + K6 \cdot \frac{dNe}{dt} \quad (10)$$

or $$Tin = Te + \Delta Te + K6 \cdot \frac{dNe}{dt} + K7 \cdot \frac{dNin}{dt} \quad (11)$$

provided Tcl is torque transmitted from the crankshaft 2 of the engine 1 through the clutch 3 to the input side pulley 7 or 8, Te is engine torque corresponding to throttle position $\theta$, $\Delta$Te is an increment of engine torque corresponding to air-fuel ratio reduction of mixture, K6 and K7 are constants, dNe/dt is differential value of engine speed Ne with respect to time, and dNin/dt is differential value of rotational speed Nin of the input side pulley 7 or 8 with respect to time.

Torque transmitted from the belt 11 to the output side pulley 9 or 10 is Tin/e and the belt engaging radius in the output side pulley 9 or 10 is approximately proportional to 1/(1+e). Since the more the transmitted torque Tin/e is increased and the more the belt engaging radius is decreased, the more the belt 11 is likely to slip over the surface of the output side pulley 9 or 10, the controlling accuracy of the line pressure is to be improved by making the line pressure proportional to (Tin/e)·(e+1), i.e. defining Vout as formula (2) to set the line pressure corresponding to the belt transmitted torque and the belt engaging radius.

Figure 11:
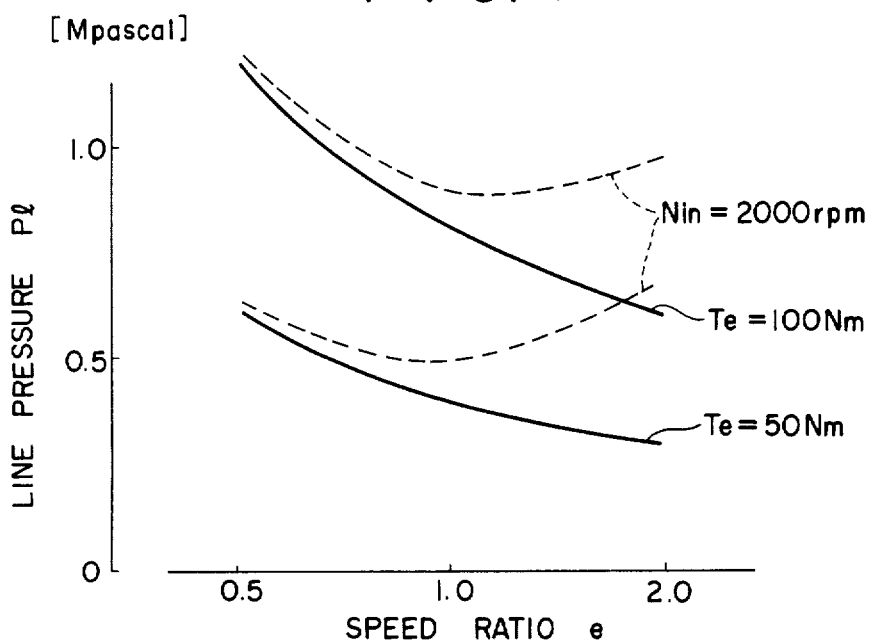
FIG. 11 is a graph illustrating the relationship between the speed ratio of the CVT and a line pressure.
Figure 12:
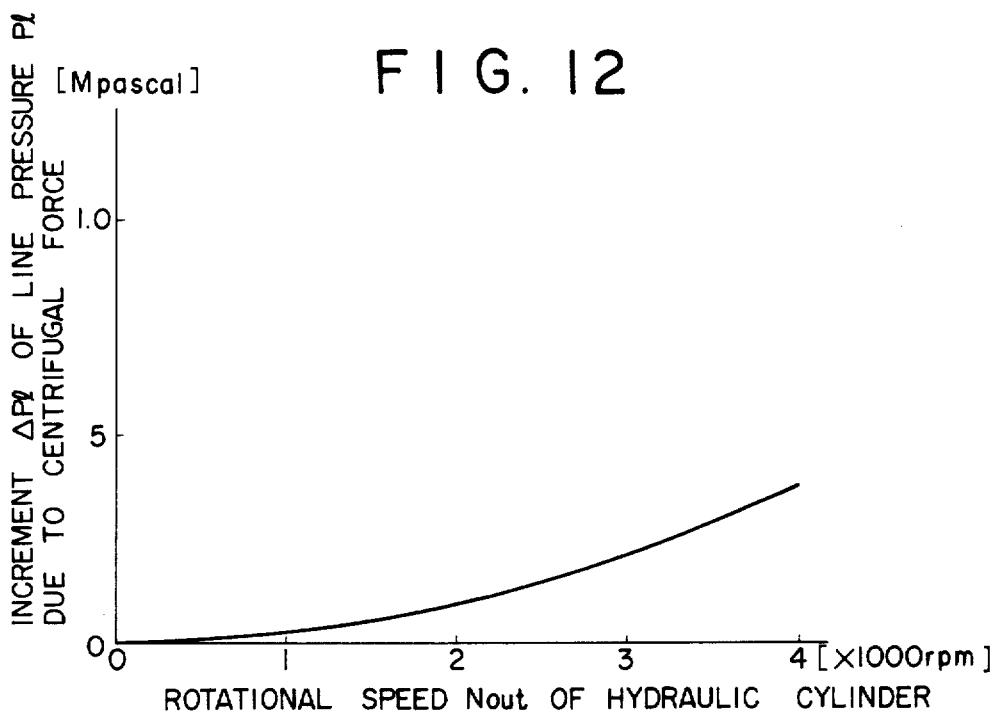
FIG. 12 is a graph illustrating the relationship between the rotational speed of the hydraulic cylinder to which the line pressure is supplied and the increment of the line pressure due to a centrifugal force produced in the cylinder.

The output side hydraulic cylinder rotates integrally with output side pulley 10 and a centrifugal force proportional to the square of the rotational speed of the output side hydraulic cylinder, i.e. the rotational speed Nout of the output side pulley 10 acts on oil in the cylinder. Oil pressure in the cylinder is raised by this centrifugal force to produce results similar to the rise of the line pressure. In FIG. 11, solid lines represent an original line pressure Pl i.e. an oil pressure produced by the pressure regulating valve 24. FIG. 12 shows the increment $\Delta$Pl of the line pressure Pl due to the centrifugal force produced in the output side hydraulic cylinder. As a result of this final line pressure in the output side hydraulic cylinder is represented by broken lines in FIG. 11. In the prefered embodiment, however, since a corrective term of K3·Nout$^2$ is added by formula (5), the increment of oil pressure caused by the centrifugal force is to be compensated.

While a pressure regulating valve 24 such as electromagnetic system relief valve controls the sectional areas of flow in the oil pump side port and the line pressure oil path side port according to the input current, the line pressure generated even if these sectional area of flow equal each other varies with the discharge pressure of the oil pump 25, thus the rotational speed Ne of the output shaft 2 of the engine 1 driving the oil pump 25. In formula (6) the corrective term K4·Ne is added so that the error of line pressure accompanying the input pressure change in the pressure regulating valve 24 is to be compensated.

To ensure speed change without any troubles in the transient time, namely rapid speed change, it is necessary to ensure the line pressure in response to the necessary speed change. While the input side or output side movable pulley 8 or 10 moves axially in relation to the speed change, the magnitude of the speed change relates to the difference $\Delta x(|x'-x|)$ between the desired position x' and the present position x of the input side or output side variable pulley 8 or 10. The difference $\Delta x$ is to be replaced with the some value of required flow at the flow controlling valve 24. Since the corrective term K5·$\Delta x$ is added in formula (7), the line pressure is corrected according to the magnitude of the speed change to ensure the rapid speed change in the transient time.

To ensure the torque transmission in any running condition, it is preferable to give a predetermined allowance to the line pressure. The corrective term $\Delta P$ for such allowance is added by formula (8) to ensure the torque transmission in any running condition.

The torque Tin of the input side pulley 7 or 8 equals the torque transmitted to the input side pulley 7 or 8 through the clutch 3 provided between the output shaft 2 of the engine 1 and the input shaft 5 of CVT 4. Tin is to be substituted by Tcl according to formula (9).

In CVT 4 the engine output torque is a function of the throttle position $\theta$. However, in warming-up or acceleration, fuel injection amount is increased and the engine output torque is increased to improve the driveability. $\Delta$Te in formula (10) corresponds to the increment of the engine output torque caused by the increase of fuel injection amount, i.e. the decrease of air-fuel ratio of mixture, and the line pressure is to be increased correspondingly to the increment of the engine output torque due to the air-fuel ratio reduction of mixture by introducing $\Delta$Te.

Torque Tin of the input side pulley 7 or 8 varies in relation to the change dNe/dt of the engine speed Ne with respect to time. By introducing the corrective term K6·dNe/dt in formula (10) is to be ensured the torque transmission accommodating the change in torque Tin accompanying dNe/dt.

When the clutch 3 is interposed between the output shaft 2 of engine 1 and the input shaft 5 of CVT 4, the change dNe/dt in the engine speed Ne with respect to time is not equalized to the change dNin/dt in the rotational speed Nin of the input side pulley 7 or 8 with respect to time due to the slip of the clutch 3 so that torque Tin of the input side pulley 7 or 8 accompanying dNin/dt is changed. The corrective term K7·dNin/dt is added in formula (11) to accommodate the change in torque Tin accompanying dNin/dt so that the torque transmission is to be ensured.

It will be apparent to those skilled in the art that various modifications and variations may be made in the elements of the invention without departing from the scope or spirit of the invention.

What is claimed is:

1. A method for compensating the line pressure in a continuously variable transmission, of a vehicle wherein said transmission has a pair of input pulleys controlled by a hydraulic pressure which is supplied to pulleys in a rotably mounted hydraulic cylinder and a pair of output pulleys, controlled in the same manner as said input pulleys, with a belt trained over said pulleys to transmit torque between said input pulleys and said output pulleys comprising the steps of:

determining the input torque Tin transmitted to said input pulley pair;

determining the rotational speed Nin of said input pulley pairs;

determining the output speed Nout of said output pulley pair;

determining a basic control value for the line pressure in response to said input torque Tin and an output/input speed ratio e of said output speed Nout and said input speed Nin;

compensating said basic control value by as a function of the square of said output rotational speed Nout to compensate for errors produced by the centrifugal force;

controlling the line pressure in response to said compensated basic control value.

2. A method as in claim 1 where said input torque is determined by a torque sensor.

3. A method as defined in claim 1, wherein said input torque Tin is determined by the following formula:

$$Tin = Te + \Delta Te + K6(dNe/dt) + K7(dNin/dt)$$

provided Te is an engine torque, $\Delta Te$ is an increment of engine torque corresponding to air-fuel ratio reduction of mixture and K6 and K7 are constants.

* * * * *

UNITED STATES PATENT AND TRADEMARK OFFICE
CERTIFICATE OF CORRECTION

PATENT NO. : 4,718,306

DATED : Jan. 12, 1988

INVENTOR(S) : Takashi Shigematsu et al.

It is certified that error appears in the above-identified patent and that said Letters Patent is hereby corrected as shown below:  On the title page --Related U.S. Application Data is incorrectly recorded. It should read:

Division of Ser. No. 891,427, Aug. 4, 1986, which is a continuation of Ser. No. 642,654, Aug. 21,1984.--

Signed and Sealed this

Seventh Day of June, 1988

*Attest:*

DONALD J. QUIGG

*Attesting Officer*   *Commissioner of Patents and Trademarks*